(12) United States Patent
Fisher et al.

(10) Patent No.: US 7,369,516 B1
(45) Date of Patent: May 6, 2008

(54) ADAPTIVE ECHO CANCELING

(76) Inventors: Abraham Fisher, 15 Harofeh Street, Haifa 34367 (IL); Isaac Nativ, 26 Summit St., Newton, MA (US) 02458

( * ) Notice: Subject to any disclaimer, the term of this patent is extended or adjusted under 35 U.S.C. 154(b) by 0 days.

(21) Appl. No.: 10/204,649

(22) PCT Filed: Feb. 21, 2000

(86) PCT No.: PCT/IL00/00109

§ 371 (c)(1),
(2), (4) Date: Aug. 20, 2002

(87) PCT Pub. No.: WO01/63786

PCT Pub. Date: Aug. 30, 2001

(51) Int. Cl.
*H04B 3/20* (2006.01)

(52) U.S. Cl. ................................ 370/292; 375/222

(58) Field of Classification Search ......... 370/286–289
See application file for complete search history.

(56) References Cited

U.S. PATENT DOCUMENTS

| | | | |
|---|---|---|---|
| 4,481,622 A | | 11/1984 | Cheng et al. |
| 4,663,766 A | * | 5/1987 | Bremer .................. 375/225 |
| 4,674,103 A | * | 6/1987 | Chevillat et al. ........... 375/231 |
| 4,811,342 A | * | 3/1989 | Huang ..................... 370/292 |
| 4,905,282 A | * | 2/1990 | McGlynn et al. ........... 380/266 |
| 5,687,169 A | * | 11/1997 | Fullerton .................. 370/324 |
| 5,754,589 A | * | 5/1998 | Maitra et al. ............. 375/216 |
| 6,094,422 A | * | 7/2000 | Alelyunas et al. .......... 370/286 |
| 6,252,901 B1 | * | 6/2001 | Mueller et al. ............ 375/222 |
| 6,317,455 B1 | * | 11/2001 | Williams et al. ........... 375/222 |
| 6,577,871 B1 | | 6/2003 | Budka et al. |
| 6,603,745 B1 | | 8/2003 | Antonio et al. |
| 6,690,666 B1 | * | 2/2004 | Norrell et al. ............. 370/386 |
| 6,781,965 B1 | * | 8/2004 | Milosevic et al. .......... 370/286 |

(Continued)

FOREIGN PATENT DOCUMENTS

EP  0391715  * 10/1990

(Continued)

OTHER PUBLICATIONS

Verhoeckx et al,; Digital echo cancellation for baseband data transmission; Acoustics, Speech, and Signal Processing [see also IEEE Transactions on Signal Processing], IEEE Transactions on vol. 27, Issue 6, Dec. 1979 pp. 768-781☐☐.*

(Continued)

*Primary Examiner*—Edan Orgad
*Assistant Examiner*—Salman Ahmed

(57) ABSTRACT

A method for transmitting data signals in full duplex with echo cancellation between a first and a second modem connected by a two-wire channel, wherein a data signal is a function of at least one data symbol in a stream of data symbols generated by a modem comprising: determining echo cancellation coefficients for the first modem; transmitting data signals in full duplex between the two modems using the echo cancellation coefficients to cancel echoes in data signals received by the first modem; providing at least one hiatus in data symbol generation by the second modem while continuing data symbol generation by the first modem at a time at which echo cancellation using the echo cancellation coefficients is effective in canceling echoes in data signals received by the first modem; and updating the first modem echo cancellation coefficients during the at least one second modem hiatus.

34 Claims, 3 Drawing Sheets

U.S. PATENT DOCUMENTS

| | | | |
|---|---|---|---|
| 2002/0131455 A1* | 9/2002 | Cioffi et al. | 370/503 |
| 2004/0071242 A1* | 4/2004 | Agazzi et al. | 375/348 |
| 2004/0071243 A1* | 4/2004 | Agazzi et al. | 375/348 |
| 2004/0091038 A1* | 5/2004 | Agazzi et al. | 375/233 |
| 2004/0156461 A1* | 8/2004 | Agazzi et al. | 375/350 |
| 2004/0181738 A1* | 9/2004 | Agazzi et al. | 714/767 |
| 2005/0157779 A1* | 7/2005 | Hasegawa et al. | 375/219 |

FOREIGN PATENT DOCUMENTS

| | | | |
|---|---|---|---|
| EP | 0 513 527 | | 11/1992 |
| EP | 0 630 119 | | 12/1994 |
| EP | 0806852 | * | 11/1997 |
| WO | WO0174047 | * | 10/2001 |
| WO | WO0191371 | * | 11/2001 |

OTHER PUBLICATIONS

Guidoux et al.,;Binary Passband Echo Canceller in a 4800 Bit/s Two-Wire Duplex Modem; Selected Areas in Communincations, IEEE Journal on vol. 2, Issue 5, Sep. 1984 pp. 711-721□□.*

Weiping Li et al.; Frequency and symbol rate offset compensating algorithms for simultaneous estimation of echo and channel responses; Information Theory, IEEE Transactions on vol. 44, Issue 4, Jul. 1998 pp. 1702-1708.*

Quatieri et al.; Decision-directed echo cancellation for full-duplex data transmission at 4800bps; Acoustics, Speech, and Signal Processing, IEEE International Conference on ICASSP '86. vol. 11, Apr. 1986 pp. 1337-1340.*

"The Theory and Practice of Modem Design;" by John A. C. Bingham; Copyright 1988 by John Wiley and Sons Inc.; pp. 370-373.

Mueller, K. H.; "A New Digital Echo Canceler for Two-Wire Full-DuplexData Transmission;" pp. 956-962;Sep. 1976; IEEE Transactions on Communications; vol. Com-24; No. 9.

* cited by examiner

ADAPTIVE ECHO CANCELING

FIELD OF THE INVENTION

The invention relates to canceling echoes in a communication link and in particular to canceling echoes in a full duplex modem that simultaneously transmits and receives data signals over a two-wire cable.

BACKGROUND OF THE INVENTION

A full duplex two-wire communication link comprises two full duplex modems connected by a single two-wire cable, such as for example a twisted-pair, over which each modem simultaneously transmits data signals to and receives data signals from the other modem. Generally, the data signals that are transmitted by a modem are samples, determined using an appropriate sampling function and sampling rate, of data symbols in a stream of data symbols that the modem generates which represent the actual data being transmitted by the modem. The samples are generated by sampling a product of the sampling function and the symbols at the sampling rate as they stream through a sampling window of suitable width in symbol periods (i.e. at any one time the sampling window contains an integral number of symbols). The data symbols are symbols from an appropriate symbol constellation and are organized in the data symbol stream in symbol frames.

The transmitter and receiver of each modem in the communication link are generally connected to the twisted-pair via a circuit known in the art as a hybrid circuit. In optimal operation, the hybrid circuit minimizes energy from signals transmitted by the modem's transmitter from reaching the modem's receiver and prevents energy from received signals from reaching the modem transmitter. The output impedance of the modem's hybrid also terminates the twisted-pair. Optimally, the hybrid of each of the modems terminates the twisted-pair with impedance substantially equal to the impedance of the twisted-pair.

In general some energy from a signal transmitted by a modem "leaks" through its hybrid circuit to the modem's receiver and generates an echo of the transmitted signal at the modem's receiver. In addition, the impedance of a twisted-pair can vary in time as a result of changes in temperature and humidity, changes in stray capacitance of the cable or physical damage to the cable. The output impedance of a hybrid can also vary with changes in temperature and humidity. Optimal termination of a twisted-pair by a hybrid is therefore generally difficult to achieve and maintain. As a result, when one modem in the two-wire link transmits a signal to the other modem, some of the energy in the transmitted signal is reflected back to the receiver of the transmitting modem. The reflected energy, as does the energy that leaks through the hybrid, generates echoes of the transmitted pulse at the transmitting modem's receiver.

Incoming data signals received by the modem are therefore usually mixed with and corrupted by echoes from a plurality of outgoing data signals that the modem itself has transmitted at times prior to the reception of the incoming data signal. In general, the amount of reflected energy in echoes that the modem receives is substantial and energy received from near echoes can often be greater than the energy of incoming data signals.

Most modems in a full duplex two-wire communication link therefore generally process incoming data signals to reduce the amount of energy from echoes that corrupts the incoming data signals. Various "echo canceling" methods for reducing echo contamination of data signals received by a modem are known in the art. Generally, these methods involve generating a simulated echo that provides an estimate as a function of time of the echoes that the modem receives from data signals that the modem transmits. When a data signal is received by the modem, the simulated echo is subtracted from the received data signal to correct it for corruption by echoes.

The simulated echo at a particular time is generally assumed to be a linear function of a plurality of data signals transmitted by the modem at times prior to the particular time. The function is defined by a set of coefficients, each of which multiplies the amplitude of one of the plurality of transmitted data signals to determine the contribution of the transmitted data signal to the simulated echo at the particular time. The coefficients, hereinafter referred to as "echo cancellation coefficients", are determined for each modem of the communication link during a half duplex training period in which the modem transmits data signals and the other modem is silent. During the training period signals received at the transmitting modem comprise only echoes of its own transmitted data signals and noise. The echo cancellation coefficients are determined so that after subtraction of the simulated echo from incoming signals during the half duplex training session, the output of the modem receiver is substantially due only to channel noise (which cannot be canceled by the simulated echo). The determination of the echo cancellation coefficients for a modem during the half duplex training period and generation of the simulated echo during subsequent full duplex communication are generally performed by an appropriate processor comprised in the modem. The processor receives signals proportional to data signals transmitted by the modem and signals from the output of the modem receiver and processes the signals it receives to determine a suitable set of echo cancellation coefficients. Usually, the echo cancellation coefficients are determined using a least squares minimizing algorithm that determines values for the echo cancellation coefficients that minimize the square of the receiver output signals during the half duplex training period.

Following determination of the simulated echo cancellation coefficients for each modem, the two-wire communications link is operable to provide full duplex communication between the two modems with echo cancellation correction of data signals transmitted between the modems. As long as the echo characteristics of the communication link are stable and do not change substantially, use of the echo cancellation coefficients that are determined in the training period provides relatively efficient echo cancellation. If however, echo characteristics of the communication link change substantially, echo cancellation using the coefficients can be degraded and quality of communication, as measured for example by eye quality monitoring (EQM) and post detection signal to noise ratio (PDSNR) reduced.

If quality of communication becomes unacceptable due to changes in echo characteristics of the communication link, full duplex communication over the link is stopped and a new training period is initiated to update the echo cancellation coefficients for the modems and renegotiate data transmission rates. Each new training period generally interrupts communication between the modems for a relatively extended period of time. Such interruptions are not acceptable for communication applications that require uninterrupted data flow between the modems.

A method for updating cancellation coefficients without interrupting full duplex communication over a two wire communications link is described in "A New Digital Echo Canceler for Two-Wire Full-Duplex Data Transmission" by K. H. Mueller, IEEE Transactions on Communications; Vol. Com-24, No. 9, September 1976, the disclosure of which is incorporated herein by reference. The method is also described in "The Theory and Practice of Modem Design" by John A. C. Bingham; copyright 1988 by John Wiley and Sons Inc.; pp 371-373, the disclosure of which is incorporated herein by reference. Whereas the method described in the above references does not require stopping full duplex communication, the method is relatively slow. As a result, it is not efficient for updating echo cancellation coefficients in situations for which echo characteristics of a communication link change relatively rapidly.

SUMMARY OF THE INVENTION

Aspects of the present invention relate to providing an echo cancellation method for a full duplex two-wire communication link that performs updating of echo cancellation coefficients without substantially interrupting full duplex communication between the two modems in the communication link.

An aspect of the present invention relates to regularly updating echo coefficients for each of the modems during relatively short periodic "update periods". Between any two consecutive update periods, quality of communication over the communication link does not substantially deteriorate due to changes in echo characteristics of the link.

In a preferred embodiment of the present invention, during full duplex communication over the communication link, each of the modems periodically stops generating symbols for a short period of time, hereinafter referred to as a "hiatus", and as a result stops transmitting data signals. During a hiatus of one modem the other modem continues data signal transmission and enters an update period. The modem in the update period suspends processing incoming signals as data signals and processes received signals, which comprise only echoes of its own transmissions and noise, using methods known in the art, to update its echo cancellation coefficients. At the end of the hiatus, the modem in hiatus resumes generating symbols and transmitting data signals responsive to the symbols, thereafter the modem in update resumes processing received signals as data signals and the communication link returns to full duplex communication.

Whereas, the data signals transmitted by a modem are samples of symbols from a symbol stream representing data transmitted by the modem, organization of data transmitted by a modem and synchronization between two modems in a communication link is done by symbol frame. Therefore, to prevent errors in data transmission, the duration of a hiatus, hereinafter referred to as a "hiatus width", and the time between any two consecutive hiatuses, hereinafter referred to as a "hiatus cycle period, of a modem are preferably determined so that they are integer multiples of a symbol frame period. In addition, to facilitate synchronization of hiatuses and update periods and to prevent a hiatus of one modem overlapping a hiatus of the other modem, preferably hiatus cycle periods for both modems are equal. Preferably, a delay time between a hiatus of one modem and a following hiatus of the other modem is constant. Preferably, the hiatus widths of all hiatuses are equal.

Unlike in prior art echo canceling methods, an echo canceling method according to preferred embodiments of the present invention does not "wait" for quality of communication to become unacceptable in order to update the coefficients. Therefore, between updates, optimum values for the echo cancellation coefficients of a modem do not drift substantially from the values of the coefficients.

As a result of updating coefficients that are generally close to their optimum values and updating during half-duplex operation, in accordance with a preferred embodiment of the present invention, updating is relatively more efficient and rapid than in prior art echo cancellation methods. Therefore, echo cancellation coefficients adjusted in accordance with a preferred embodiment of the present invention track their optimum values, as echo characteristics of the communication link change, with greater accuracy than echo cancellation coefficients adjusted using prior art methods. In addition, because echo cancellation is relatively efficient, quality communication between the modems can be consistently maintained using a hiatus width and cycle frequency chosen so that the "hiatus duty cycle" is relatively small. Preferably the hiatus width is less than 15 ms. More preferably, the hiatus width is less than 10 ms. Even more preferably, the hiatus width is less than 5 ms. Most preferably, the hiatus width is less than 3 ms. Preferably, the hiatus duty cycle is less than 0.5% so that the duty cycle for full duplex data transmission is greater than 99%. More preferably the hiatus duty cycle is less than 0.3%, so that the duty cycle for full duplex data transmission is greater than 99.4%. Most preferably the hiatus duty cycle is equal to or less than about 0.1% so that the duty cycle for full duplex data transmission is equal to or greater than 99.8%. As a result, full duplex transmission is substantially continuous and the hiatuses do not substantially reduce an average rate at which data is transmitted in full duplex between the modems. It should be noted that although full duplex data transmission is stopped for short periods of time during hiatuses, data is transmitted in half duplex during the hiatuses so that in accordance with a preferred embodiment of the present invention data transmission is substantially continuous.

There is therefore provided in accordance with a preferred embodiment of the present invention a method for transmitting data signals in full duplex with echo cancellation between a first and a second modem connected by a two-wire channel, wherein a data signal is a function of at least one data symbol in a stream of data symbols generated by a modem comprising:

determining echo cancellation coefficients for the first modem;

transmitting data signals in full duplex between the two modems using the echo cancellation coefficients to cancel echoes in data signals received by the first modem;

providing at least one hiatus in data symbol generation by the second modem while continuing data symbol generation by the first modem at a time at which echo cancellation using the echo cancellation coefficients is effective in canceling echoes in data signals received by the first modem; and updating the first modem echo cancellation coefficients during the at least one second modem hiatus.

Preferably, the method comprises: determining echo cancellation coefficients for the second modem; using the second modem echo cancellation coefficients to cancel echoes in data signals received by the second modem during the full duplex data signal transmission; providing a hiatus in data symbol generation by the first modem while continuing data symbol generation by the second modem at a time at which echo cancellation using the second modem echo cancellation coefficients is effective in canceling echoes in data signals received by the second modem; and updating the echo cancellation coefficients of the second modem during the first modem hiatus.

Preferably, the at least one second modem hiatus comprises a plurality of hiatuses. Preferably, the method comprises updating the echo cancellation coefficients of the first modem during each of the plurality of hiatuses of the second modem. Preferably, the at least one first modem hiatus comprises a plurality of first modem hiatuses. Preferably, the method comprises updating the echo cancellation coefficients of the second modem during each of the plurality of hiatuses of the first modem. Preferably, one hiatus of the second modem occurs between every pair of temporally adjacent hiatuses of the first modem.

Preferably, the hiatuses of the plurality of second modem hiatuses follow one after the other at a frequency defined by a substantially constant second modem hiatus cycle period. The hiatuses of the plurality of second modem hiatuses preferably follow one after the other at a frequency defined by a substantially constant first modem hiatus cycle period. Preferably, the first modem hiatus cycle period is substantially equal to the second modem hiatus cycle period.

All the hiatuses of the plurality of second modem hiatuses preferably have a same duration. All the hiatuses of the plurality of first modem hiatuses preferably have a same duration. Preferably, the first modem hiatuses is equal to the duration of the second modem hiatuses.

Preferably, data symbols in the data symbol streams generated by the first and second modems are formatted in data symbol frames having a same frame period and the duration of the at least one first modem hiatus is an integer multiple of the frame period. Preferably, the first and second modem hiatus cycle periods are integer multiples of the frame period.

A time lapse between a first modem hiatus and an immediately subsequent second modem hiatus preferably is the same for all first modem hiatuses. Preferably, updating echo coefficients of each of the modems comprises counting frame periods from a time at which updating of the modem coefficients began during a hiatus of the other modem and when the number of frames counted is equal to the number of symbol periods in a hiatus cycle period, beginning updating the coefficients again.

Additionally or alternatively, a data signal transmitted by the first or second modem is preferably a sample of a convolution of a sampling function and the data symbol stream generated by the modem and samples are taken at a sampling frequency defined by a substantially constant sampling period. Preferably, updating echo cancellation coefficients of each modem comprises counting sampling periods from a time at which updating began during a hiatus of the other modem and when the number of sampling periods counted is equal to the number of sample periods in a hiatus cycle period beginning updating the coefficients again.

In some preferred embodiments of the present invention, updating echo cancellation coefficients comprises determining at least one time at which to begin updating the coefficients by determining when energy received by the modem decreases to an energy below a predetermined threshold energy. Preferably, updating echo cancellation coefficients comprises ending updating at a time at which the average energy received by the one modem rises from below the threshold to above the predetermined threshold.

Additionally or alternatively, the predetermined threshold is preferably less than 1.3 times the average energy received by the modem from echoes and channel noise. Additionally or alternatively, the predetermined threshold is preferably less than 1.2 times the average energy received by the modem from echoes and channel noise. Additionally or alternatively, the predetermined threshold is preferably equal to 1.1 times the average energy received by the modem from echoes and channel noise.

In some preferred embodiments of the present invention, the plurality of hiatuses has a duty cycle less than 0.5%. In some preferred embodiments of the present invention, the plurality of hiatuses has a duty cycle less than 0.3%. In some preferred embodiments of the present invention, the plurality of hiatuses has a duty cycle substantially equal to 0.1%.

In some preferred embodiments of the present invention, the duration of the symbol generation hiatus is less than 15 milliseconds. In some preferred embodiments of the present invention, the duration of the symbol generation hiatus is less than 10 milliseconds. In some preferred embodiments of the present invention, the duration of the symbol generation hiatus is less than 5 milliseconds. In some preferred embodiments of the present invention, the duration of the symbol generation hiatus is less than 3 milliseconds.

BRIEF DESCRIPTION OF FIGURES

The invention will be described in the following description of non-limiting preferred embodiments thereof read with reference to figures attached hereto. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DESCRIPTION OF PREFERRED EMBODIMENTS

Figure 1:
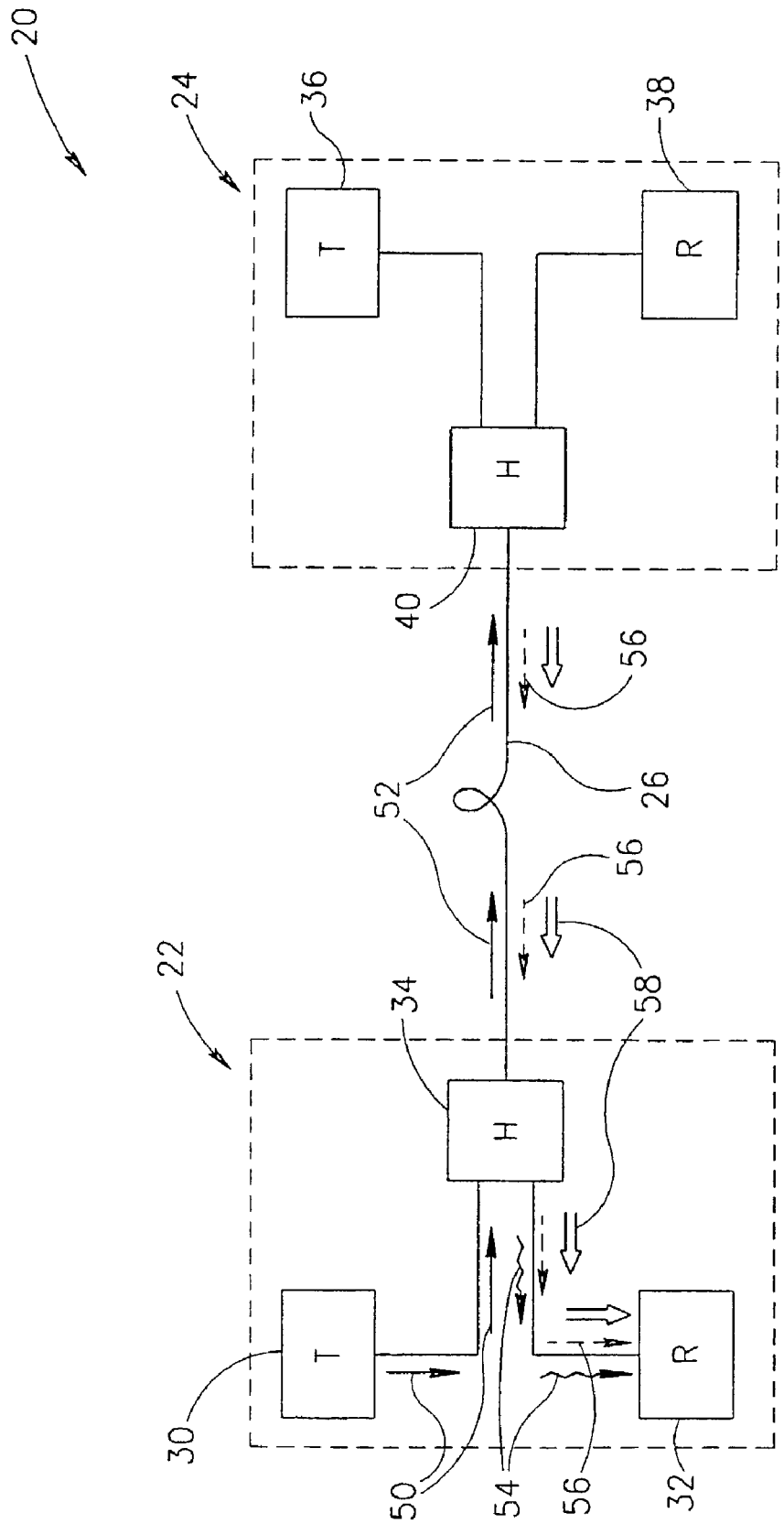
FIG. 1 schematically illustrates the formation of echoes in a two wire communication link comprising two two-wire full duplex modems connected by a twisted-pair.

FIG. 1 schematically illustrates the formation of echoes in a two-wire communications link 20. Communications link 20 comprises two two-wire modems 22 and 24 connected by a two-wire cable such as by way of example a twisted-pair 26. Modem 22 typically comprises a transmitter 30 and receiver 32 that are connected to a hybrid circuit 34. Modem 24 typically comprises a transmitter 36 and receiver 38 that are connected to a hybrid circuit 40. Hybrid circuits 34 and 40 are connected to twisted-pair 26. Obviously, modems 22 and 24 may be substantially more complicated than shown, however, only those components of modems 22 and 24 that are required for the discussion are shown in FIG. 1.

In FIG. 1, transmitter 30 of modem 22 is schematically shown transmitting data signals, which are represented by arrows 50. Transmitted data signals 50 enter hybrid circuit 34, which couples a portion of the energy of each data signal 50 to twisted-pair 26, over which the coupled energy propagates on to modem 24 as an attenuated data signal represented by an arrow 52. The energy from a transmitted data signal 50 that is not transmitted to modem 24 is dissipated in receiver 32 and in a balancing circuit (not shown) comprised in hybrid 34. The portion of the energy of a transmitted data signal 50 that is dissipated in receiver 32 generates an echo, represented by wavy arrow 54, of the transmitted data signal 50 in the receiver shortly after the data signal is transmitted by transmitter 30.

Because of mismatches between twisted-pair 26 and hybrid 40 of modem 24, some of the energy of each attenuated data signal 52 that reaches modem 24 is reflected from the junction of hybrid 40 with twisted-pair 26 back to modem 22. The reflected energy, represented by a dashed arrow 56, reaches receiver 32 as an echo of the transmitted data signal 50. If there are any impedance discontinuities along twisted-pair 26, receiver 32 also receives echoes of a transmitted data signal 50 from energy reflected from the transmitted data signal's attenuated data signal 52 at the discontinuities. In the above discussion of echo formation only echoes generated by a single reflection of energy from a transmitted data signal are described. However, reflected energy is of course itself reflected at impedance discontinuities and receiver 32 is generally also exposed to echoes caused by multiple reflections of energy in a transmitted data signal.

Receiver 32 of modem 22 is therefore seen to receive at least one and usually a plurality of echoes from each data signal 50 that it transmits. As a result, during full duplex communication over link 20, data signals received by modem 22 from modem 24 are generally corrupted with echoes from data signals 50 transmitted by modem 22. In FIG. 1 data signals transmitted by modem 24 to modem 22 are represented by double line arrows 58.

In order to minimize the effects of echoes on received signals and increase the accuracy with which a signal received by modem 20 represents a data signal sent by modem 24, generally modem 22 comprises an echo canceler. For a received signal sampled at a time t, the echo canceler generates simulated echo that is an estimate of the echo that corrupts the received signal. The simulated echo is subtracted from the received signal by a summing circuit comprised in modem 22 or receiver 32 to "cancel" echoes in the received signal. Generally, the simulated echo is assumed to be a linear function of signals transmitted by modem 22 at "N" sequential sampling times immediately prior to and equal to the time at which the received signal is sampled.

Let the sampling times of modem 20 be represented by nT, where T is the sampling interval and n is an integer from $-\infty$ to $+\infty$. If $A_k$ and $SE_k$ represent respectively a transmitted data signal and a simulated echo at sampling time kT (k=an integer), then $SE_k=$ $$\sum_{i=0}^{N} A_{k-i} Ca_i,$$

where the $Ca_j$ are constant coefficients, i.e. echo cancellation coefficients. Let a received signal which is sampled at a sampling time kT be represented, after echo cancellation by $S_k$. Usually, the echo coefficients $Ca_j$ are evaluated prior to data transmission over communication link 20 by determining values for the $Ca_j$ that minimize $(S_k)^2$ during a half duplex training period in which modem 24 does not transmit data signals so that the "true" signal (other than reflections) is equal to 0.

Modem 24 is of course affected by noise and echoes from transmission of signals similarly to the way in which modem 22 is affected by echoes from transmission of signals, and echo canceling is similarly performed by modem 24 using a simulated echo defined by echo cancellation coefficients.

In prior art, once determined in training periods, echo cancellation coefficients for modems 22 and 24 are used until quality of data transmission over communication link 20 becomes unacceptable due to changes in echo characteristics of the communication link. If and when this occurs data transmission over communications link 20 is stopped and modems 22 and 24 are retrained to update values for the echo cancellation coefficients.

Figure 2:
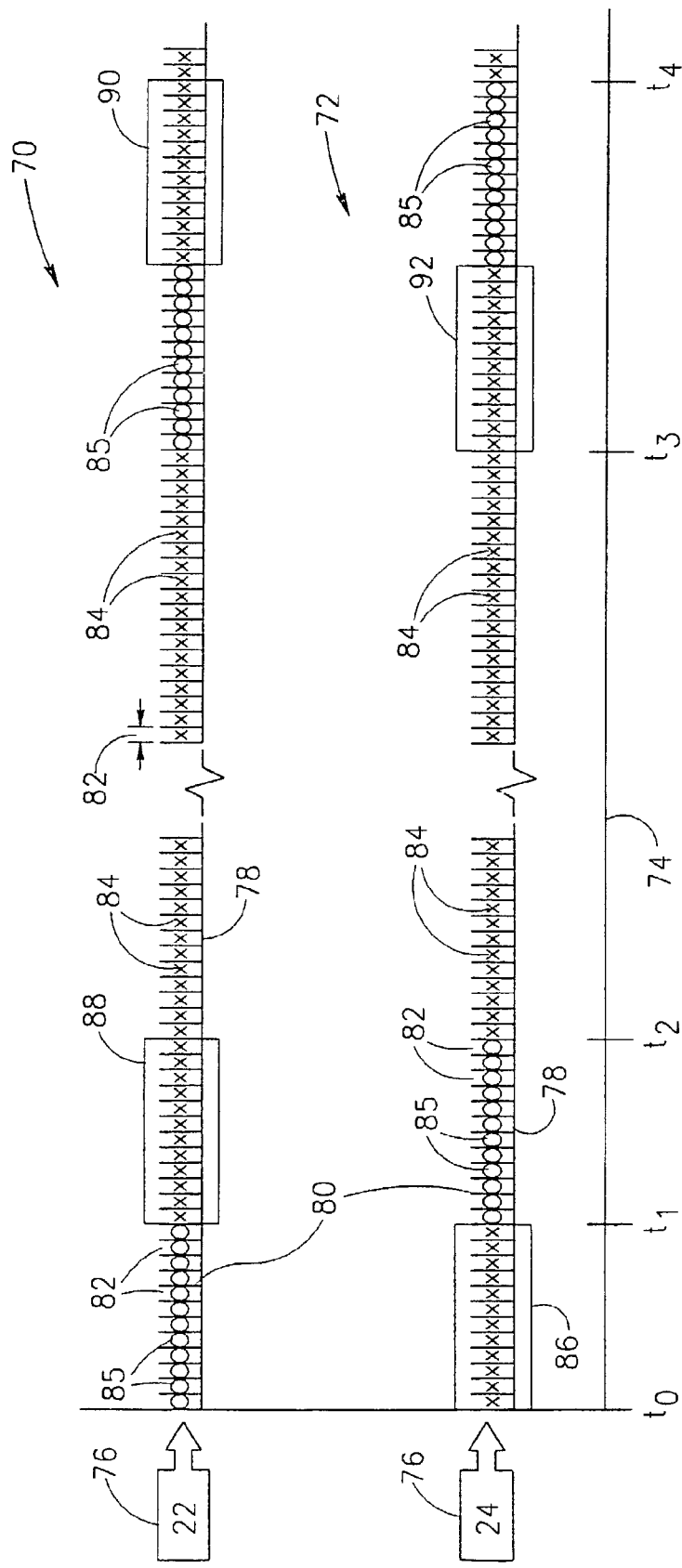
FIG. 2 schematically shows training periods during which echo cancellation coefficients are determined for the modems shown in FIG. 1 and subsequent retraining periods during which the coefficients are updated, in accordance with prior art.

FIG. 2 schematically shows time sequences of training periods and full duplex data transmission for communications link 20 and modems 22 and 24 shown in FIG. 1, according to prior art. Since data transmission by a modem is organized and synchronized according to symbol frames, it is convenient to discuss data transmission between modems 22 and 24 in terms of the symbols and symbol frames that they transmit.

A top time line 70 in FIG. 2 schematically shows symbol transmission and training periods as a function of time for modem 22. A bottom time line 72 in FIG. 2 shows symbol transmission and training periods as a function of time for modem 24. Time lines 70 and 72 share a common time axis 74. A block arrow 76 shown at the left of each time line 70 and 72 contains a numeral identifying the modem associated with the time line.

Each time line 70 and 72 has a base line 78 crossed with vertical graduation lines 80. A distance between any two adjacent graduation lines 80 represents a time equal to a symbol frame period i.e. time along a base line 78 is measured in units equal to the duration of a symbol frame period. A space 82 between any two adjacent graduation lines 80 is used to represent a symbol frame period. An "X" 84 in a frame period 82, i.e. in a space 82 representing the frame period, of a time line 70 or 72 represents a frame of symbols being transmitted by the modem associated with the time line. For example, if modems 22 and 24 communicate according to a V.34 protocol, an X represents eight transmitted symbols. A "0" 85 in a frame period 82 of a time line indicates that the modem associated with the time line is not transmitting at the time of the frame period.

From time $t_0$ to time $t_1$ there is no data communication between modem 22 and modem 24 and (FIG. 1) modem 24 is in an echo training period indicated by a rectangle 86 during which modem 24 determines its echo cancellation coefficients. During training period 86 modem 22 is silent and modem 24 is transmitting symbols 84 and receiving echoes from its own transmissions. Generally, symbols 84 transmitted by modem 24 during its training period are for training purposes only and do not comprise "real" information to be transmitted by modem 24 to modem 22. From time $t_1$ to time $t_2$ modem 22 is in an echo training period indicated by rectangle 88. During training period 88 modem 24 is silent and modem 22 is transmitting symbols 84 and "listening" to echoes of its transmissions. As during training period 86, during training period 88 only "training information" is transmitted by modem 22.

At time $t_2$ following training periods 86 and 88 full duplex communication with echo cancellation begins between modems 22 and 24. Echo cancellation using the echo cancellation coefficients determined during training periods 86 and 88 is effective and quality of communication between modems 22 and 24 is high.

By time $t_3$ echo characteristics of communication link 20 have changed and the echo cancellation coefficients determined in training periods 86 and 88 are no longer optimum. As a result, quality of communication between modems 22 and 24 degrades and becomes unacceptable. Full duplex communication stops and modems 22 and 24 undergo extended retraining in half duplex training periods 90 and 92 during which the echo cancellation coefficients are updated and data transmission rates between the modems renegotiated. During training periods 90 and 92 only training information is transmitted by modems 22 and 24. At time $t_4$ full duplex communication over data link 20 resumes.

Figure 3:
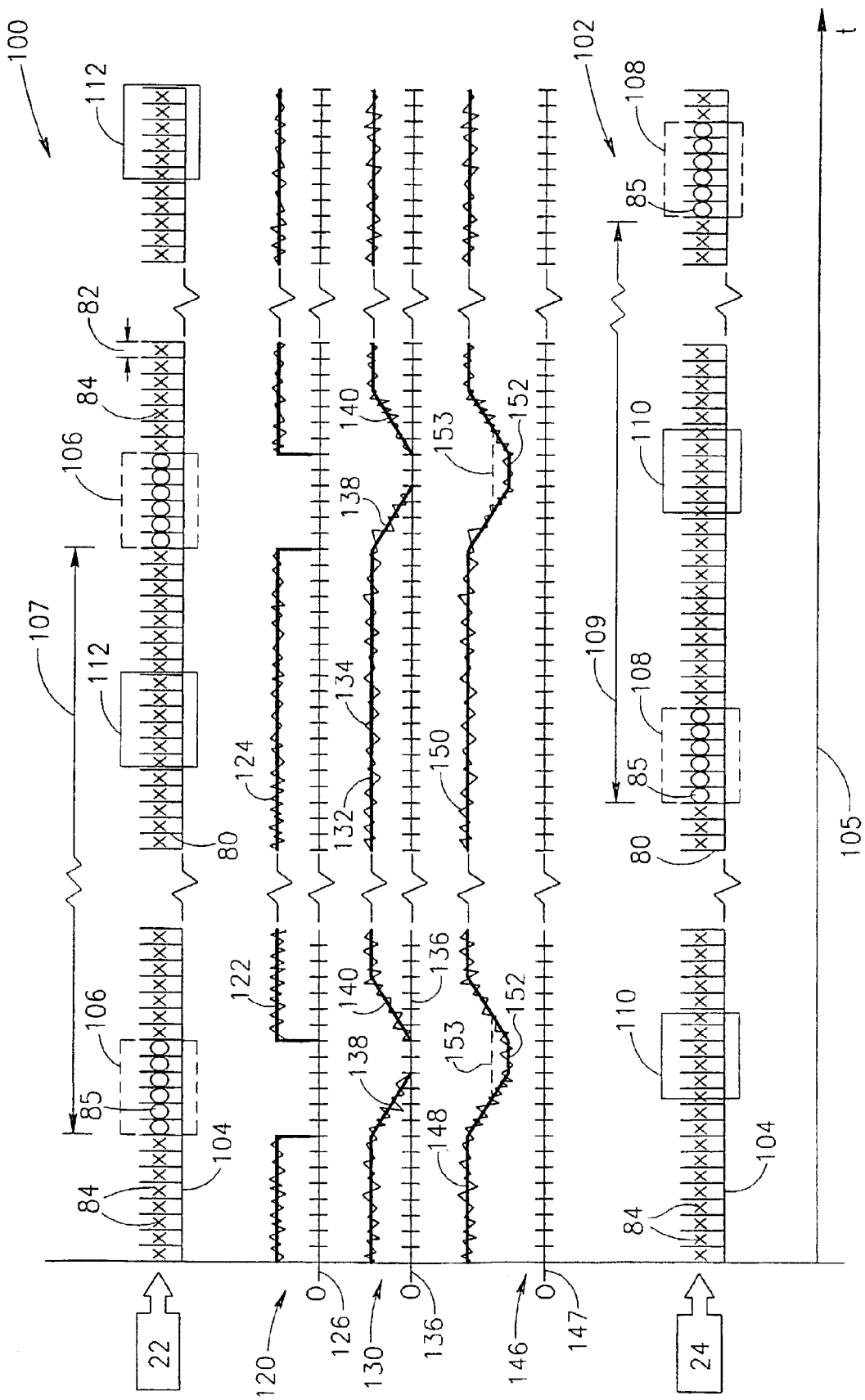
FIG. 3 schematically shows updating echo canceling coefficients in the two-wire communication link shown in FIG. 1, in accordance with a preferred embodiment of the present invention.

FIG. 3 schematically shows time sequences of training periods and full duplex data transmission for communications link 20 and modems 22 and 24 shown in FIG. 1, according to a preferred embodiment of the present invention. In FIG. 3 top and bottom time lines 100 and 102 schematically show training periods and symbol transmission as functions of time for modems 22 and 24. Transmission and lack of transmission of a frame of symbols during a symbol frame period 82 are indicated for each time line 100 and 102 by an "X" 84 and a "0", 85 respectively. Time lines 100 and 102 share a time axis 105.

Unlike echo cancellation methods used in prior art, following an initial training period (not shown) in which echo cancellation coefficients are calculated and transmission rates negotiated, during subsequent full duplex communication, each modem 22 and 24 periodically goes into a hiatus during which it stops generating symbols. Preferably, modems 22 and 24 go into hiatuses alternately. Hiatuses for modem 22 are indicated on timeline 100 by dashed rectangles 106 (and of course the presence of a "0s" 85) and for modem 24 on timeline 102 by dashed rectangles 108. Similarly, a hiatus cycle period for modem 24 is indicated by double arrowhead line 109. The dimensions of rectangles 106 and 108 parallel to time axis 105 represent the hiatus widths (i.e. time duration of the hiatuses) of hiatuses 106 and 108.

During each hiatus 106 of modem 22, modem 24 continues transmitting data symbols 84, and enters an update period represented by rectangle 110 during which it processes signals that it receives, which are echoes of its own transmitted symbols and noise, to update its echo cancellation coefficients. Similarly, during each hiatus 108 of modem 24, modem 22 enters an update period indicated by a rectangle 112 during which modem 22 updates its cancellation coefficients. Updating may be performed using any suitable algorithm for updating echo cancellation coefficients during half duplex communication known in the art. The dimensions of rectangles 110 and 112 parallel to time axis 105 represent the duration of update periods 110 and 112. Synchronization of update periods 110 and 112 with their corresponding hiatuses is discussed below.

In order to prevent errors in data transmission between modems 22 and 24 and ensure that each modem 22 and 24 shifts seamlessly between hiatuses, update periods and full duplex data transmission, hiatuses and update periods have to be synchronized. Widths of hiatuses 106 and 108 and hiatus cycle periods 107 and 109 must be multiples of a symbol frame period 82. A hiatus preferably begins at a time that coincides with a time at which transmission of a symbol frame ends, i.e. at a graduation line 80. Preferably, the widths of hiatuses 106 and 108 are equal. In addition, to prevent hiatuses 106 and 108 periodically overlapping, preferably hiatus cycle periods 107 and 109 are equal. Preferably, a time delay between a hiatus 106 of modem 22 and a subsequent hiatus 108 is constant. Preferably, the time delay is equal to one half hiatus cycle period 107 (or 109).

In FIG. 3 the energy of symbols 84, (i.e. the square of the amplitudes of symbols 84 to within a constant of proportionality), that are generated by modem 22 are schematically shown below time line 100 in a graph 120. Bold line 122 represents average energy of symbols 84 and curved line 124 schematically represents the energy of individual symbols 84 as a function of time shown along an abscissa 126. The ordinate scale of graph 120 is arbitrary and time along abscissa 126 is coincident with time along time line 100. The average energy of symbols 84 is of course equal to zero during hiatuses 106.

As noted above, each data signal transmitted by a modem is a function of a product of a sampling function and a plurality of consecutive symbols in a sampling window of symbols. The amplitude of a transmitted data signal is a weighted average (weighted by the sampling function) of the amplitudes of the symbols in the sampling window at the time that the data signal is generated. Energy of data signals that are generated and transmitted by modem 22 responsive to symbols 84 are schematically shown below graph 120 in a graph 130. Bold line 132 and curved line 134 represent average energy of transmitted data signals and energy of individual transmitted data signals respectively as functions of time shown along abscissa 136. In FIG. 3 it is assumed by way of example that hiatuses 106 (and hiatuses 108) are six frame periods 82 long and that a sampling window used by modem 22 (and modem 24) to generate data signals is four frame periods long. When modem 22 is generating symbols 84, the average energy of the data signals is substantially constant and is represented by segments of bold line 132 that are parallel to and above abscissa 136.

However, when modem 22 enters a hiatus 106, with each symbol period following the onset of the hiatus, the number of symbols 84 in the sampling window decreases by one. As a result, with each subsequent symbol period, the average energy of data signals transmitted by modem 22 decreases as indicated by segments 138 of bold line 132. Following a time lapse from the beginning of a hiatus 106 equal to the width of the sampling window, the sampling window is empty, the energy of transmitted data signals is zero, and the modem is "silent". The modem remains silent for a period of time equal to two (by way of example) frame periods, which is the difference between the width of hiatuses 106 (six frame periods 82) and the width of the sampling window (four frame periods 82). From a time at which a hiatus 106 ends, with each subsequent symbol period, a symbol is added to the window and the average energy of data signals increases, as indicated by segments 140 of bold line 132. Following a time lapse equal to the width of the sampling window, the average energy of transmitted data signals has regained the value that it had prior to the onset of the hiatus 106.

It should be noted that line segments 138 and 140 that represent the decrease and increase in data signal energy are shown as straight (which implies that the sampling function is a constant) for convenience of presentation. In practice, the sampling function is generally not constant and different sampling functions known in the art are useable in accordance with preferred embodiments of the present invention.

The data signals that are transmitted by modem 22, at times at which they reach modem 24 are generally attenuated and adulterated with echoes from data signals transmitted by modem 24 and with channel noise. Bold line 148 schematically shows the average energy of signals received by modem 24 and curved line 150 schematically shows the energy of individual signals received by modem 24 as a function of time shown along an abscissa 147. The scale of the ordinate of graph 146 is arbitrary.

Bold line 148 tracks bold line 132, which in graph 130 represents the average energy of data signals at the time that the data signals are transmitted by modem 24, relatively accurately. However, during a hiatus 106 of modem 22, the average energy of received signals does not become equal to zero, as does the average energy of transmitted signals. As the energy of data signals transmitted by modem 22 decreases to zero, after modem 22 enters a hiatus 106, energy of signals received at modem 24 plateau to a level equal to the average energy of signals generated by noise and echoes. The plateaus are indicated by segments 152 of bold line 150.

During times that correspond to line segments 152, modem 24 receives substantially no energy from modem 22 and is exposed substantially only to channel noise and echoes from its own data signals that it transmits responsive to symbols 84 that it generates (modem 24 is not in hiatus). At times close to a plateau 152 prior to and following the plateau, data signals transmitted by modem 22 have relatively little energy and modem 24 receives relatively little energy from modem 24. The inventors have found therefore that for each hiatus 106 of modem 22 it is possible to perform updating of echo cancellation coefficients for modem 24 for a period of time that begins before the plateau 152 corresponding to the hiatus and ends at a time after the end of the plateau. In accordance with a preferred embodiment of the present invention, each update period 110 of modem 24 begins at time after onset of a corresponding hiatus 106 of modem 22 at which average energy of signals received by modem 24 decreases to an energy below a predetermined threshold energy. Preferably, the average energy of signals received by modem 24 is determined to be below the threshold energy if during a period of time having a predetermined duration modem 24 does not receive a signal having energy greater than the threshold. Preferably, the update period ends at a time at which the average energy of signals received by modem 24 increases from below the threshold energy to above the threshold energy. Preferably, the threshold energy is less than 1.3 times the average energy that modem 24 receives from noise and echoes. More preferably the threshold energy is less than 1.20 the average energy of energy from noise and echoes. Most preferably, the threshold energy is equal to or less than 1.1 time the energy from noise and echoes. The update periods 110 of modem 24 are schematically represented by dashed lines 153.

Update periods 112 of modem 22 are similarly synchronized with hiatuses 108 of modem 24. Update periods 112 coincide with periods of time during hiatuses 108 when energy of signals received by modem 24 is less than or equal to a predetermined threshold energy which is proportional to an average energy expected from channel noise and echoes.

In some preferred embodiments of the present invention modem 22 or 24 locates a hiatus of the other modem and determines when to start an update period 112 or 110 respectively by monitoring the energy of signals that it receives. When the average energy falls below the predetermined threshold energy, the modem begins an update period.

However, all relevant time periods, i.e. hiatus widths, and hiatus cycle periods, that govern communication between modems 22 and 24 are "quantized" in units of frame periods 82. Therefore, in accordance with a preferred embodiment of the present invention, each modem 22 and 24 determines when to begin a next hiatus or an update period by "symbol counting" from a previous hiatus or update period. For example, in FIG. 3 hiatuses 106 and 108 are shown, in accordance with a preferred embodiment of the present invention, having widths equal to six symbol frame periods 82. If, by way of example, modems 22 and 24 communicate with each other according to a V.34 protocol, each symbol frame 84 comprises eight symbols. Hiatuses 106 and 108, and their corresponding update periods 110 and 112 are therefore forty-eight symbols long. Assume, by way of example, that the hiatus cycle periods 107 and 109 are 1500 frame periods long and therefore 12000 symbols long. During full duplex data transmission, in accordance with a preferred embodiment of the present invention, each modem determines when to start a hiatus or an update period by counting 12000 symbol periods from its last hiatus or update period respectively.

In the above example, if the symbol rate in accordance with the V.34 protocol symbol is 2400*10/7 symbols per second, the duration of hiatuses 106 and 108, which have hiatus widths equal to forty eight symbols, is 14 ms long and hiatus cycle periods 107 and 109 are 3.5 seconds long. The hiatus duty cycle, in accordance with a preferred embodiment of the present invention is therefore 0.4%.

Determining when to start update periods by "symbol counting" requires that a first update period of each modem 22 and 24 is properly timed to coincide with a hiatus of the other modem. In order for each modem to synchronize its first update period with a hiatus of the other modem, in accordance with a preferred embodiment of the present invention, when full duplex communication between modems 22 and 24 begins, each modem goes into a "hiatus search mode". During a hiatus search mode the modem searches for and locates a "first" hiatus of the other modem. Preferably, the modem locates a hiatus by determining when the energy of signals that it receives plateau close to the average energy of signals generated by channel noise and echoes. Once a first hiatus is located, the modem synchronizes its first update period with the located hiatus. Thereafter, each modem 22 and 24 determines when to enter an update period 112 and 110 respectively by symbol counting.

In some preferred embodiments of the present invention a modem determines when to start a hiatus or update period by counting sampling periods, wherein a sampling period is a reciprocal of the sampling rate at which data signals are generated. In these embodiments of the present invention hiatus cycle periods and sampling periods are determined so that a hiatus cycle period is an integral multiple of sampling periods. When counting sampling periods is used to determine when to start hiatuses and update periods, preferably each modem periodically reverts to the hiatus search mode to recalibrate timing between update periods and hiatuses and correct for any loss of synchronization between the modems.

Hiatus cycle periods 107 and 109 and the widths of hiatuses 106 and 108 are determined, in accordance with a preferred embodiment of the present invention, so that the "duty cycle" of hiatuses 106 and 108 does not substantially affect an average rate at which data is transmitted between the modems. In addition, hiatus cycle time 107 is chosen, in accordance with a preferred embodiment of the present invention, so that between hiatuses 106 and 108, changes in echo characteristics of communication link 20 do not, generally, cause substantial degradation in quality of data transition. As a result, echo cancellation coefficients for each modem 22 and 24 remain current and close to their optimum values throughout data transmission. Quality of full duplex communication between modems 22 and 24 therefore does not generally degrade as echo characteristics of communication link 20 change. Relatively long retraining periods during which echo cancellation coefficients having values far from optimum are updated and data transmission rates renegotiated are avoided.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of preferred embodiments thereof that are provided by way of example and are not intended to limit the scope of the invention. The described preferred embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for transmitting data signals on a modem connection between a first and a second modem, comprising:
    determining echo cancellation coefficients for the first modem;
    transmitting data signals in full duplex between the first and second modems;
    providing a transmission hiatus of the second modem, in which an average energy of signals on a transmission line of the second modem is lower than in full duplex transmission;
    identifying the transmission hiatus of the second modem by the first modem, by determining that the energy of the signals received by the first modem from the second modem is below a predetermined threshold energy;
    beginning updating echo cancellation coefficients of the first modem, responsive to identifying the transmission hiatus of the second modem;
    identifying further transmission hiatuses of the second modem by the first modem, by counting sampling periods, which sampling periods are a reciprocal of the sampling rate at which data signals are generated for transmission; and
    periodically repeating the identifying of the transmission hiatus of the second modem by the first modem in order to recalibrate timing of the first modem,
    wherein providing the transmission hiatus comprises decreasing the number of symbols in a transmission window, from which signals are provided to the transmission line.

2. A method according to claim 1, wherein providing the transmission hiatus comprises providing, at a time at which the echo cancellation coefficients of the first modem are effective in canceling echoes in data signals received by the first modem.

3. A method according to claim 2, wherein the first modem transmits information carrying data signals as in the full duplex transmission during the transmission hiatus of the second modem.

4. A method according to claim 1, wherein determining the echo cancellation coefficients for the first modem is first performed during a stage of establishing the modem connection.

5. A method according to claim 4, wherein determining the echo cancellation coefficients comprises transmitting training signals which do not include data and determining the coefficients responsive to reception of the training signals.

6. A method according to claim 1, wherein providing the transmission hiatus does not include performing a connection retrain between the full duplex transmission and the transmission hiatus.

7. A method according to claim 1, comprising providing at least one first-modem transmission hiatus, while information carrying data signals are transmitted by the second modem as in the full duplex transmission.

8. A method according to claim 7, wherein the at least one first-modem transmission hiatus comprises a plurality of first-modem transmission hiatuses and the transmission hiatus of the second-modem belongs to a series of a plurality of second-modem transmission hiatuses.

9. A method according to claim 8 wherein one transmission hiatus of the second modem occurs between every pair of temporally adjacent transmission hiatuses of the first modem.

10. A method according to claim 9 wherein the second modem transmission hiatuses follow one after the other at a frequency defined by a substantially constant second modem hiatus cycle period.

11. A method according to claim 10 wherein the first modem transmission hiatuses follow one after the other at a frequency defined by a substantially constant first modem hiatus cycle period.

12. A method according to claim 11 wherein the first modem hiatus cycle period is substantially equal to the second modem hiatus cycle period.

13. A method according to claim 12 wherein all the second modem hiatuses have a same duration.

14. A method according to claim 13 wherein all the first modem hiatuses have a same duration.

15. A method according to claim 14 wherein the duration of the first modem hiatuses is equal to the duration of the second modem hiatuses.

16. A method according to claim 15, wherein the data signals transmitted by the first and second modems comprise data symbol frames having a same frame period and wherein the duration of the first-modem hiatuses is an integer multiple of the frame period.

17. A method according to claim 16 wherein the first and second modem hiatus periods are integer multiples of the frame period.

18. A method according to claim 16 wherein a time lapse between a first modem hiatus and an immediately subsequent second modem hiatus is the same for all first modem hiatuses.

19. A method according to claim 8, wherein the plurality of hiatuses has a duty cycle less than 0.5%.

20. A method according to claim 19, wherein the plurality of hiatuses has a duty cycle less than 0.3%.

21. A method according to claim 20, wherein the plurality of hiatuses has a duty cycle substantially equal to 0.1%.

22. A method according to claim 1, wherein the predetermined threshold is less than 1.3 times the average energy received by the modem from echoes and channel noise.

23. A method according to claim 22, wherein the predetermined threshold is less than 1.2 times the average energy received by the modem from echoes and channel noise.

24. A method according to claim 23, wherein the predetermined threshold is equal to 1.1 times the average energy received by the modem from echoes and channel noise.

25. A method according to claim 1, wherein the duration of the transmission hiatus is less than 15 milliseconds.

26. A method according to claim 25, wherein the duration of the transmission hiatus is less than 10 milliseconds.

27. A method according to claim 26, wherein the duration of the transmission hiatus is less than 5 milliseconds.

28. A method according to claim 1, wherein the transmission hiatus comprises a silence period in which the second modem does not transmit data signals.

29. A method according to claim 28, wherein the second modem does not transmit any signals during the silence period.

30. A method according to claim 1, wherein the transmission hiatus is provided at a time selected irrespective of the quality of the connection.

31. A method according to claim 1, wherein updating the echo cancellation coefficients of the first modem comprises updating responsive to signals received from the connection.

32. A method for transmitting data signals on a modem connection between a first and a second modem, comprising:
   determining echo cancellation coefficients for the first modem;
   transmitting data signals in full duplex between the first and second modems;
   providing at least one transmission hiatus of the second-modem, in which an average energy of signals on a transmission line of the second modem is lower than in full duplex transmission;
   updating echo cancellation coefficients of the first modem during the second modem transmission hiatus;
   identifying an end of a transmission hiatus of the second modem by the first modem, by determining that the energy of the signals received by the first modem from the second modem is above a predetermined ending threshold energy; and
   ending the update of the echo cancellation coefficients responsive to identifying that the energy received by the first modem from the second modem is above the predetermined ending threshold energy,
   identifying at least some transmission hiatuses of the second modem by the first modem, by counting sampling periods, which sampling periods are a reciprocal of the sampling rate at which data signals are generated for transmission; and
   periodically repeating the identifying of the end of a transmission hiatus of the second modem by the first modem,
   wherein the second modem ends the transmission hiatus by increasing the number of symbols in a transmission window, from which signals are provided to the transmission line.

33. A method according to claim 32, wherein the duration of the transmission hiatus is less than 3 milliseconds.

34. A method according to claim 32, wherein the second-modem hiatus comprises a silence period in which the second modem does not transmit data signals.

* * * * *